(12) United States Patent
Morris

(10) Patent No.: US 9,139,096 B2
(45) Date of Patent: Sep. 22, 2015

(54) ONE-SIDED DETECTION AND DISABLING OF INTEGRATOR WIND UP FOR SPEED CONTROL IN A VEHICLE

(75) Inventor: Robert L. Morris, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1137 days.

(21) Appl. No.: 13/024,447

(22) Filed: Feb. 10, 2011

(65) Prior Publication Data

US 2012/0065820 A1    Mar. 15, 2012

Related U.S. Application Data

(60) Provisional application No. 61/382,059, filed on Sep. 13, 2010.

(51) Int. Cl.
| | |
|---|---|
| *B60L 11/00* | (2006.01) |
| *B60L 3/00* | (2006.01) |
| *B60W 10/08* | (2006.01) |
| *B60W 20/00* | (2006.01) |
| *B60W 30/20* | (2006.01) |
| *B60W 50/00* | (2006.01) |

(52) U.S. Cl.
CPC ............ *B60L 3/0038* (2013.01); *B60W 10/08* (2013.01); *B60W 20/00* (2013.01); *B60W 30/20* (2013.01); *B60L 2240/421* (2013.01); *B60L 2240/423* (2013.01); *B60L 2240/443* (2013.01); *B60L 2270/145* (2013.01); *B60W 2050/001* (2013.01); *B60W 2710/081* (2013.01); *B60W 2710/083* (2013.01); *Y02T 10/646* (2013.01); *Y02T 10/648* (2013.01)

(58) Field of Classification Search
CPC ............... B60W 2050/0011; B60W 2050/001; B60W 2050/0008; B60W 2050/0009; B60W 10/04; B60W 10/06; B60W 10/08; B60W 30/143
USPC ......................................................... 701/22
See application file for complete search history.

(56) References Cited

U.S. PATENT DOCUMENTS

2010/0042278 A1*    2/2010   Falkenstein .................... 701/22

* cited by examiner

*Primary Examiner* — John Q Nguyen
*Assistant Examiner* — Kyung Kim
(74) *Attorney, Agent, or Firm* — Quinn Law Group, PLLC

(57) ABSTRACT

A method or algorithm controls a motor in a vehicle having a proportional-integral controller. The controller determines a commanded damping control torque as a proportional output torque value and a commanded motor speed control torque as an integrator output torque value. The integrator torque output value is frozen only if the proportional torque output value saturates against a limit and the direction of the speed error is the same as that of the integrator torque output value. The proportional torque output value is calculated using different error values than are used in calculating the integrator output value. A vehicle includes one or more traction motors and the controller noted above. For two motors, the controller determines the damping torques and motor speed control torques separately for each motor.

12 Claims, 2 Drawing Sheets

ONE-SIDED DETECTION AND DISABLING OF INTEGRATOR WIND UP FOR SPEED CONTROL IN A VEHICLE

CROSS-REFERENCE TO RELATED APPLICATIONS

This application claims the benefit of U.S. Provisional Patent Application No. 61/382,059, which was filed on Sep. 13, 2010, and which is hereby incorporated by reference in its entirety.

TECHNICAL FIELD

The present disclosure relates to a proportional-integral control method and system for providing speed and damping torque control in a vehicle, wherein wind up of the integral terms, i.e., the integrator, is detected and selectively disabled in one error direction.

BACKGROUND

A hybrid vehicle includes a controller that manages the torque output of multiple prime movers, such as one or more electrical traction motors and an internal combustion engine. Driveline vibrations in such a vehicle are typically minimized by cancelling torque oscillations at a specific frequency or within a particular frequency range. Torque cancellation techniques may include passing driveline inputs through signal conditioning filters. This process can slow overall system responsiveness. Engine speed is typically used as a single feedback variable to command a corresponding control signal, for instance engine torque. However, single-variable feedback control schemes can provide inadequate vibration damping in a vehicle having multiple prime movers.

Another approach to minimizing driveline vibrations includes active driveline damping. In such an approach, desired powertrain and driveline operating states are determined. A motor damping torque is then calculated and added to a commanded motor torque in a manner that varies with the transmission operating mode. Damping torque and speed control are provided via a proportional-integral (PI) or a proportional-integral-derivative (PID) controller, as understood in the art, with the damping torque and speed control commands ordinarily decoupled with respect to each other. That is, the gains required for driveline damping and speed control are separately calibrated and applied. A large rise or "wind up" in a given set point can occur, causing the integral (I) control terms from an integrator portion of a PI or PID controller to accumulate significant error. This may happen when the controller is calibrated in such a way as to be unstable or marginally stable, or when the proportional torque saturates against a limit. The integral torque continues to wind up to correct the error that is building, while at the same time the proportional torque cannot correct for the wind up.

SUMMARY

Accordingly, a method is disclosed herein that allows for one-sided freezing or holding of an integrator, i.e., the integral (I) torque control terms in a proportional-integral (PI) vehicle controller. The controller provides speed and driveline damping torque control in an integrated closed-loop approach. As used herein, damping torque control refers to reducing any transient driveline oscillations before such oscillations can reach the drive wheels of the vehicle. Speed torque control refers to maintaining a particular rotating component at a target speed, e.g., idling of the engine at 700 RPM or tracking of a desired slip speed in an oncoming clutch through a shift event.

In a PI controller, the proportional (P) terms provide a relatively fast error response, while the integral (I) terms drive the plant or system being controlled to zero steady-state error, as is well understood in the art of automatic control systems. The present method and system applies a specially configured PI controller to first detect integrator wind up, i.e., the speed control commands, and then freezes, i.e., holds or prevents further variation in, an output value of the integrator whenever the proportional terms, i.e., the damping torque commands, saturate against a calibrated limit. Freezing occurs only when the integrator control terms are winding up in direction in which the proportional control terms have already saturated. In other words, if the integrator is winding down in the opposite direction, the controller permits the wind down action.

In particular, a method is set forth herein for controlling an electric traction motor in a vehicle having a PI controller. The controller is configured for determining a proportional torque value for a commanded damping control torque, and an integral torque value as a commanded motor speed torque. The method includes determining a direction of the error into the integrator, and determining if the direction is the same as the output of the integrator. If the direction is the same, integrator wind up is considered to be present. If the direction is different, integrator wind down is present.

The method further includes freezing the integrator output value at an immediately prior output value only if (a) the proportional output value, i.e., the proportional torque, has saturated against a calibrated limit, and (b) the direction of the speed error is in the same direction as the integrator output value. The method may include calculating the proportional output value using different error values than are used in calculating the integrator output value.

A vehicle is also disclosed herein that includes an electric traction motor and the PI controller noted above. The controller determines a commanded damping torque as a proportional output value, and a commanded motor speed torque as an integrator output value. The controller determines a direction of the integrator output value, and calculates a direction of a speed error into the integrator when the proportional output value has saturated with respect to a calibrated torque limit. The integrator output value is frozen at an immediately prior value only if the proportional output value has saturated and the direction of the speed error is the same as the direction of the integrator output value.

The vehicle may include two electric fraction motors in one embodiment. In this case, the PI controller determines the commanded damping torque and the commanded motor speed torque separately for each of the two traction motors as a pair of proportional output values and a pair of integrator output values, respectively.

The above features and advantages and other features and advantages of the present invention are readily apparent from the following detailed description of the best modes for carrying out the invention when taken in connection with the accompanying drawings.

DESCRIPTION

Figure 1:
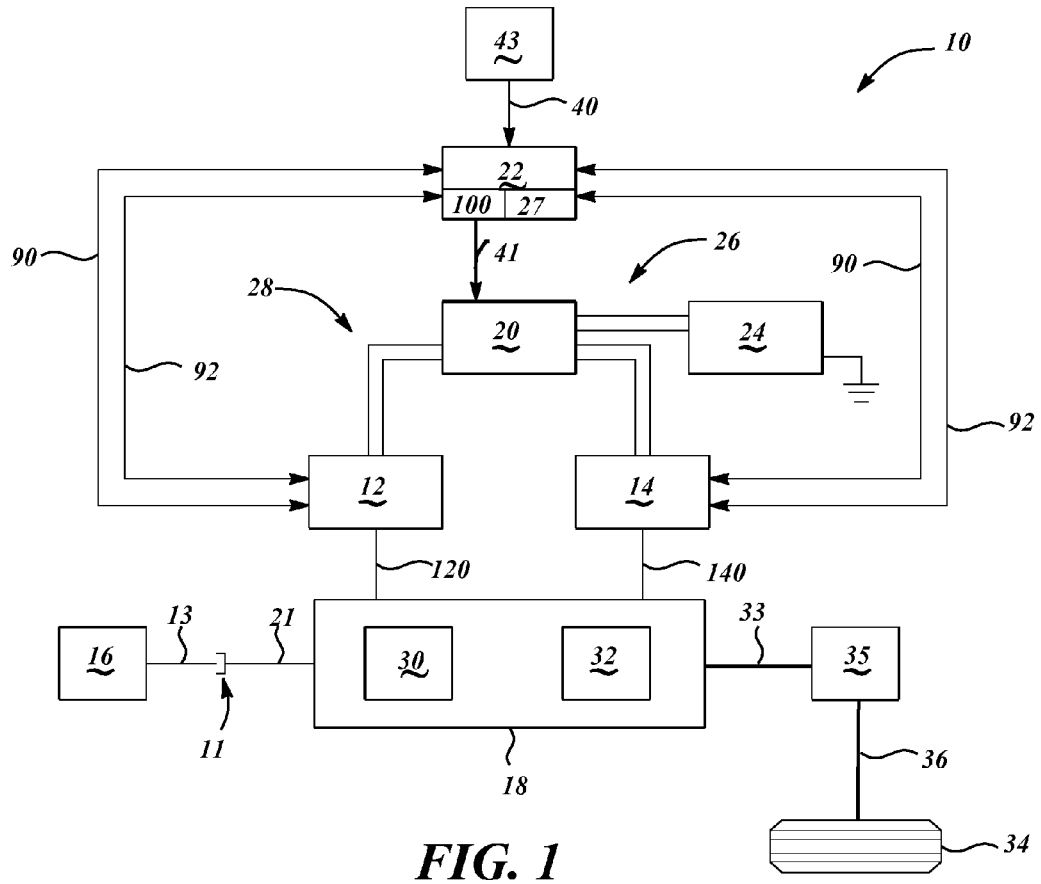
FIG. 1 is a schematic illustration of a vehicle having a proportional-integral (PI) controller that provides one-sided detection and disabling of integrator wind up as disclosed herein.

Referring to the drawings, a vehicle 10 is shown in FIG. 1 having a transmission 18. The transmission 18 receives input torque from multiple on-board torque generating devices. The torque generating devices may include an internal combustion engine 16 and/or one or two electric traction motors 12, 14, with the number of traction motors potentially varying with the vehicle design. The vehicle 10 may be configured as a parallel hybrid electric vehicle (HEV) as shown, a series HEV, a battery electric vehicle (BEV), extended range electric vehicle (EREV), or another suitable design without varying from the intended inventive scope. For simplicity, only the HEV will be explained hereinafter.

Figure 3:
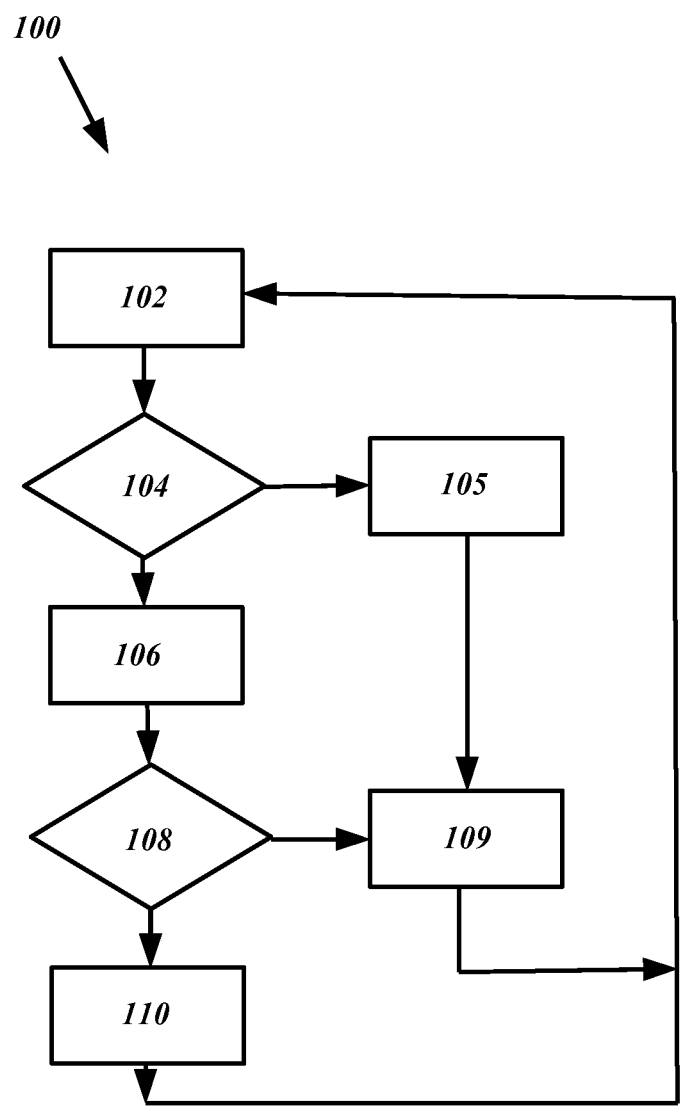
FIG. 3 is a flow chart describing the present method for one-sided detection and disabling of integrator wind up.

A proportional-integral (PI) controller 22 for the vehicle 10 includes a computing device and control logic in the form of computer-executable process instructions, i.e., the present method 100. The method 100 may be recorded in non-volatile memory 27. The controller 22 provides closed-loop motor speed and driveline damping torque control aboard the vehicle 10. In particular, the method 100, which is set forth in detail below with reference to FIG. 3, provides one-sided detection and disabling of integrator wind up within the controller 22. PI control systems typically use input speed to a transmission and various clutch slip speeds as feedback variables in calculating the required control torques. The present controller 22 instead calculates speed errors for the various traction motors, and then uses the calculated speed error values to determine the required commanded damping torques.

The controller 22 provides an indirect control method which combines motor speed and damping torque in an integrated control approach. The method 100 works within the controller 22 to enable the damping torque, i.e., the proportional (P) control terms in a PI or PID control scheme, to be fully saturated without affecting the speed control, i.e., the integral (I) control terms. In other words, the integral control terms cannot wind up without providing corrective proportional torque commands. Control is thus maintained over the integrators in the event the proportional torque becomes saturated.

With respect to the vehicle 10 aboard which the controller 22 operates, the transmission 18 includes an input member 21 and an output member 33. Within the transmission 18, one or more planetary gear sets 30 and clutches 32 may be used to transfer torque to the output member 33 in a manner that depends upon a presently commanded gear state or operating mode. The clutches 32 may be hydraulically-actuated devices in one possible embodiment. The transmission 18 may include as many planetary gear sets 30 and clutches 32 as are needed to provide the desired range of output speeds, e.g., three or more planetary gear sets and four or more clutches 32, or a single planetary gear set and two clutches in two possible embodiments.

An internal combustion engine 16 is used in the HEV designs noted above. The engine 16 may be selectively connected to the transmission 18 via an input clutch 11. The input clutch 11 thus permits a selective engagement of a crankshaft 13 of the engine 16 with the input member 21 of the transmission 18 in certain drive modes, and may include transient torque damping structure, e.g., a damper mechanism and spring (not shown) configured to damp the engine-to-transmission connection.

In an HEV, EREV, or BEV configuration, the traction motor 12 can provide motor torque via a motor output shaft 120 at levels sufficient for propelling the vehicle 10. The traction motor 14 may be used alone or in conjunction with the traction motor 12 depending on the vehicle configuration, with a motor output shaft 140 of the traction motor 14 being connected directly to the driveline of the vehicle 10 in some transmission embodiments. The traction motors 12 and/or 14 may also be used as generators as needed.

The traction motors 12 and 14 may be configured as multi-phase permanent magnet/AC induction-type electric machines, which may be individually rated for approximately 60VAC to approximately 300VAC or more depending on the vehicle design. The traction motors 12, 14 are electrically connected to an energy storage system (ESS) 24 via a high-voltage DC bus bar 26, a traction power inverter module (TPIM) 20, and a high-voltage AC bus bar 28. The ESS 24 may be configured as a multi-cell rechargeable battery or other energy storage device that can be selectively recharged using motor torque from either or both of the traction motors 12, 14, e.g., by capturing energy during a regenerative braking event.

Motor torque from the traction motors 12 and/or 14 is transmitted to their respective motor output shafts 120 and 140, each of which is connected to various members of one or more of the planetary gear sets 30 of the transmission 18. Multiple braking and/or rotating clutches 32 are also provided within the transmission 18 to selectively transfer torque from the traction motors 12 and/or 14, and/or from a crankshaft 13 of the engine 16, to an output member 33 of the transmission. The output member 33 of transmission 18 is ultimately connected to drive wheels 34 of the vehicle 10 through an axle 36 and a final gear set 35.

Still referring to FIG. 1, the TPIM 20 is a power inverter and control device configured to receive motor control commands 41 from the controller 22. The controller 22 may be electrically connected to each of the traction motors 12 and 14, and adapted for receiving raw speed data 40 from various speed sensors 43 positioned as needed throughout the vehicle 10, e.g., on or in proximity to the axle 36, the motor output shafts 120, 140, the input member 21, etc. The controller 22 controls the motor speed, operating mode, and power flow to and from the motor(s) and other electrical devices aboard the vehicle 10.

The controller 22 automatically controls a damping torque commanded from one or both of the traction motors 12 and 14 via damping torque signals 90, and a speed of the traction motors 12 and 14 via speed signals 92. Speed control is thus combined with damping control, and represents a fundamental change from using error values from speed integrators for input speed and clutch speed to using error values from speed integrators for traction motors 12 and 14 in a closed loop. This eliminates steady-state error in the motor speeds, in addition to driving the controlled speeds, e.g., input speed and clutch slip, to their respective targets. However, to this is added a one-sided detection and disabling of integrator wind up for speed control to enable damping torque, i.e., the proportional (P) control terms, to be fully saturated without having to turn off the speed control terms, i.e., the integral (I) control terms.

Figure 2:
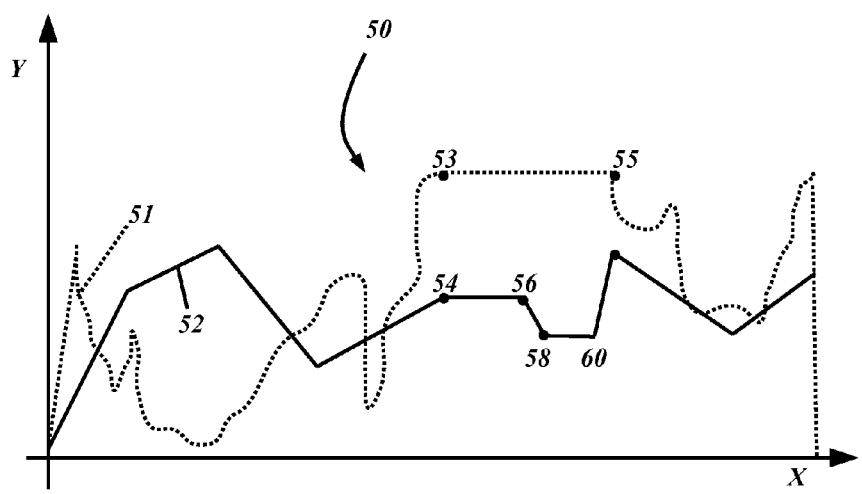
FIG. 2 is schematic illustration of a saturated damping torque and its effect on speed control when the present method is applied via the PI controller shown in FIG. 1.

Referring to FIG. 2, a set of traces 50 is plotted against time (X axis), with the Y axis representing magnitude of the various signals. Traces 50 are shown to briefly explain the effect of the present method 100. Trace 51 represents the proportional (P) control terms, i.e., the damping control torque.

Trace 52 represents the integral (I) control terms, i.e., the speed control torque. Points 53 to 55 of trace 51 represent a zone of saturated damping torque. That is, the damping torque reaches a calibrated limit at approximately point 53, and trace 51 flattens out. At the same time, the controller 22 of FIG. 1 freezes the integrator, i.e., trace 52 is frozen between points 54 and 56.

However, the integrator is allowed to wind down or change in a direction that is opposite the direction of the proportional control terms. This commences at point 56 and continues until point 58, at which point the controller 22 again freezes the integrator. That is, the trace 52 flattens out from points 58 to 60. The proportional terms (trace 51) remains saturated, and the controller 22 therefore blocks any changes in the integral terms (trace 52) occurring in the same direction. At point 55 the proportional control term begins to wind down, and the integrator (trace 52) is allowed to wind up in the opposite direction.

The controller 22 may generate the values represented by traces 51 and 52 using values such as actual engine torque, motor damping torque, desired axle torque, wheel speed, damper torque, desired input speed, and/or desired clutch speeds. These values may be determined based upon various operator inputs, e.g., a force applied to an accelerator pedal, a position of a transmission gear selector, a state of a vehicle braking system, a speed control setting, and/or other suitable operator inputs. The inputs are used to determine a desired operating state for each of the torque-generating devices used aboard the vehicle 10 in terms of reference parameters needed for achieving the various operating states.

By way of example, the following proportional (P) control terms may be calculated by controller 22 as:

$$P_A = (K_1 \cdot N_{E*}) + (K_2 \cdot N_{A*}) + (K_3 \cdot N_{B*}) + (K_4 \cdot N_{O*}) + (K_5 \cdot T_{DMPR*}) + (K_6 \cdot T_{AXLE*})$$

$$P_B = (K_7 \cdot N_{E*}) + (K_8 \cdot N_{A*}) + (K_9 \cdot N_{B*}) + (K_{10} \cdot N_{O*}) + (K_{11} \cdot T_{DMPR*}) + (K_{12} \cdot T_{AXLE*})$$

where $P_A$ and $P_B$ are the proportional control terms, i.e., the damping torque commands for the respective A and B traction motors, or traction motors 12 and 14, respectively, with $K_1$-$K_6$ representing the proportional gains. The proportional gains ($K_1$-$K_6$) can be calculated as a function of controlled engine speed ($N_E$), motor speeds ($N_A$, $N_B$) for the respective traction motors 12 and 14, damper torque ($T_{DMPR}$) for damping the engine-transmission connection, and axle torque ($T_{AXLE}$). The values denoted by an asterix (*) are the speed or torque error values, e.g., $N_{A*}$ is a speed error of motor A/traction motor 12, and $T_{AXLE*}$ is a torque error for the axle torque.

The following integral (I) control terms may be calculated by the controller 22:

$$I_A = (K_{13} \cdot N_{A*}) + (K_{14} \cdot N_{B*})$$

$$I_B = (K_{15} \cdot N_{A*}) + (K_{16} \cdot N_{B*})$$

where $I_A$ and $I_B$ are the integral speed commands for the respective traction motors 12 and 14, and $K_{13}$-$K_{16}$ represent the integral gains, which can be calculated as a function of the speed errors to the traction motors 12 and 14.

Referring to FIG. 3, a flow chart explains the present method 100 in more detail. When properly executed by the controller 22, the method 100 ensures that the integral terms, i.e., $I_A$ and $I_B$ as explained above, do not wind up without having a corresponding corrective proportional torque, i.e., $P_A$ and $P_B$. The controller 22 is not configured as a traditional PI controller, i.e., as a controller in which the proportional and integral control terms are used for input speed error or another variable being controlled. Instead, the controller 22 uses proportional terms that do not use the same errors as the integral terms, as explained in the above example. The proportional terms instead use a combination of errors from several different speeds and torques, such as engine speed, motor speed, output speed, axle torque, and damper torque.

Beginning with step 102, the controller 22 calculates the magnitude and direction of the speed error being fed into the integrator for use in calculating the integral control terms. Once the speed error has been calculated at step 102, the sign or direction of the speed error is evaluated at step 104. If the speed error is not in the same direction as the immediately prior integrator output, the controller 22 proceeds to step 105. If the speed error is in the same direction as the immediately prior integrator output, the controller 22 proceeds to step 106.

At steps 105 and 106, the controller 22 may set a flag indicating the result determined at step 104. At step 105, a flag is set to FALSE, zero (0), or another suitable value indicating that the integrator is not winding up, and proceeds to step 109. At step 106, a flag is set to TRUE, one (1), or another suitable value indicating that the integrator is presently winding up. The controller 22 then proceeds to step 108.

At step 108, the controller 22 determines whether the motor torque for the traction motor 12 and/or 14 has saturated. If the motor torque has saturated, the controller 22 proceeds to step 110. If not, the controller 22 proceeds to step 109.

At step 109, the controller 22 continues to calculate and apply the integral terms. The controller 22 then repeats step 102 and any subsequent steps as described above.

At step 110, the controller 22 freezes the integrator to its last output value, and holds the integral terms at their prior values, then repeats step 102. This can be seen in trace 54 of FIG. 2 between points 56 and 58. The values remain frozen in this manner until a step in the sequence of method 100 indicates that it is acceptable to unfreeze the integral values.

While the best modes for carrying out the invention have been described in detail, those familiar with the art to which this invention relates will recognize various alternative designs and embodiments for practicing the invention within the scope of the appended claims.

The invention claimed is:

1. A method for controlling a traction motor in a vehicle having a traction motor and a proportional-integral (PI) controller, wherein the PI controller is configured for determining a commanded damping torque of the traction motor as a proportional torque output value and a commanded motor speed of the traction motor as an integrator torque output value, the method comprising:
   determining a direction of the integrator torque output value;
   determining a direction of an integrator speed error when the proportional output torque value saturates with respect to a calibrated torque limit; and
   freezing or holding the integrator torque output value only when the proportional torque output value has saturated with respect to the calibrated torque limit and the direction of the integrator speed error is in the same direction as the integrator torque output value; and
   allowing the integrator torque output value to wind down or change in a direction that is opposite the direction of the proportional control terms.

2. The method of claim 1, further comprising:
   calculating the proportional torque output value using different error values than are used in calculating the integrator torque output value.

3. The method of claim 1, further comprising:
    determining the commanded damping torque and the commanded motor speed using at least one of: an actual engine torque, a motor damping torque, a desired axle torque, wheel speed, damper torque, a desired input speed, and a desired clutch speed.

4. The method of claim 3, wherein the at least one value is determined based upon one of: a force applied to an accelerator pedal, a position of a transmission gear selector, a state of a vehicle braking system, and a speed control setting.

5. The method of claim 1, further comprising: determining a desired operating state for the traction motor using reference parameters.

6. A vehicle comprising:
    a traction motor; and
    a proportional-integral (PI) controller that determines a commanded damping control torque of the fraction motor as a proportional torque output value and a commanded motor speed control torque of the traction motor as an integrator torque output value;
    wherein the controller is configured to:
        determine a direction of the integrator torque output value;
        calculate a direction of an integral speed error when the proportional torque output value has saturated with respect to a calibrated torque limit;
        freeze or hold the integrator output value only when the proportional torque output value has saturated against a limit and the direction of the speed error is in the same direction as the integrator torque output value; and
        allow the integrator torque output value to wind down or change in a direction that is opposite the direction of the proportional control terms.

7. The vehicle of claim 6, including a pair of the traction motors, wherein the controller is configured to determine the commanded damping control torque and the commanded motor speed control torque separately for each of the pair of traction motors as a pair of proportional output values and a pair of integrator torque output values, respectively.

8. The vehicle of claim 6, wherein the PI controller is configured for determining the commanded damping torque and the commanded motor speed using at least one of: actual engine torque, motor damping torque, desired axle torque, wheel speed, damper torque, desired input speed, and a desired clutch speed.

9. The vehicle of claim 6, wherein the PI controller is configured for calculating the proportional torque output value using different error values than are used in calculating the integrator torque output value.

10. A proportional-integral (PI) controller for a vehicle having an electric traction motor, comprising:
    a computing device having non-transitory memory; and
    process instructions recorded in non-transitory memory;
        wherein the PI controller is configured to execute the process instructions via the computing device to cause the PI controller to:
            determine a commanded damping torque of the traction motor as a proportional torque output value;
            determine a commanded motor speed of the traction motor as an integrator torque output value;
            determine a direction of the integrator torque output value;
            determine a direction of an integrator speed error when the proportional output torque value saturates with respect to a calibrated torque limit;
            freeze or hold the integrator torque output value only when the proportional torque output value has saturated against a calibrated limit and the direction of the speed error is in the same direction as the integrator torque output value; and
            allow the integrator torque output value to wind down or change in a direction that is opposite the direction of the proportional control terms.

11. The PI controller of claim 10, wherein the vehicle includes a pair of the traction motors, wherein the PI controller is configured to determine the commanded damping control torque and the commanded motor speed control torque separately for each of the pair of traction motors as a pair of proportional output values and a pair of integrator torque output values, respectively.

12. The PI controller of claim 10, wherein the computing device is configured for calculating the proportional torque output value using different error values than are used in calculating the integrator torque output value.

* * * * *